W. R. ABELL.
BRAKE.
APPLICATION FILED JULY 16, 1921.
1,428,673. Patented Sept. 12, 1922.
2 SHEETS—SHEET 2.
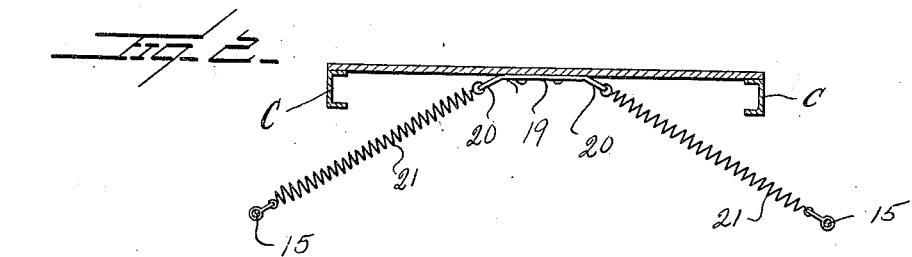
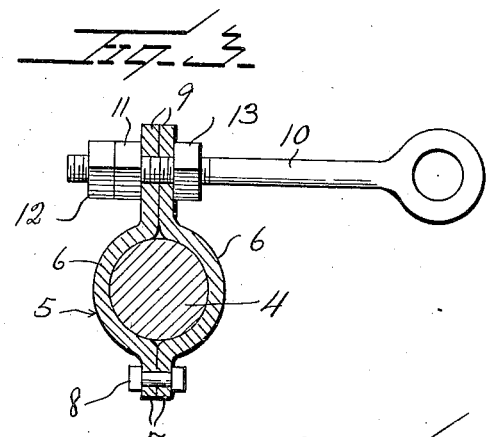
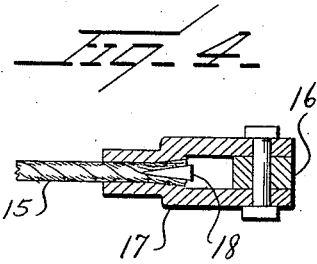
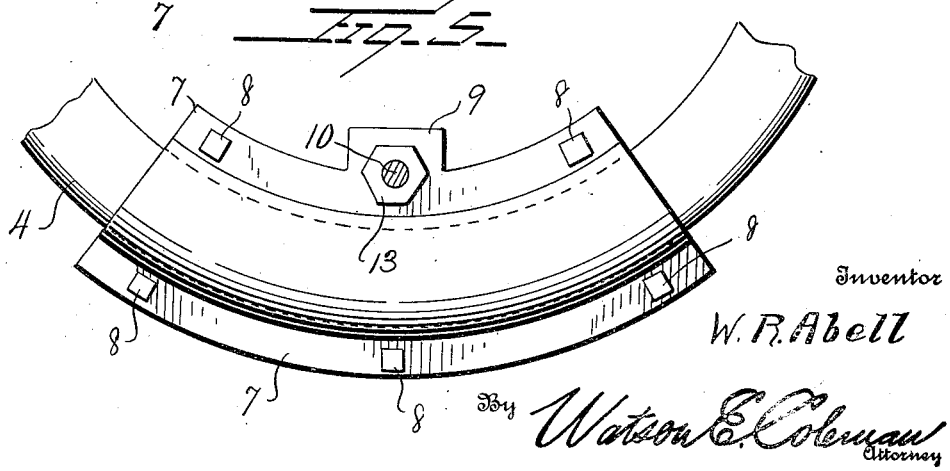
Inventor
W. R. Abell
By Watson E. Coleman
Attorney Patented Sept. 12, 1922.

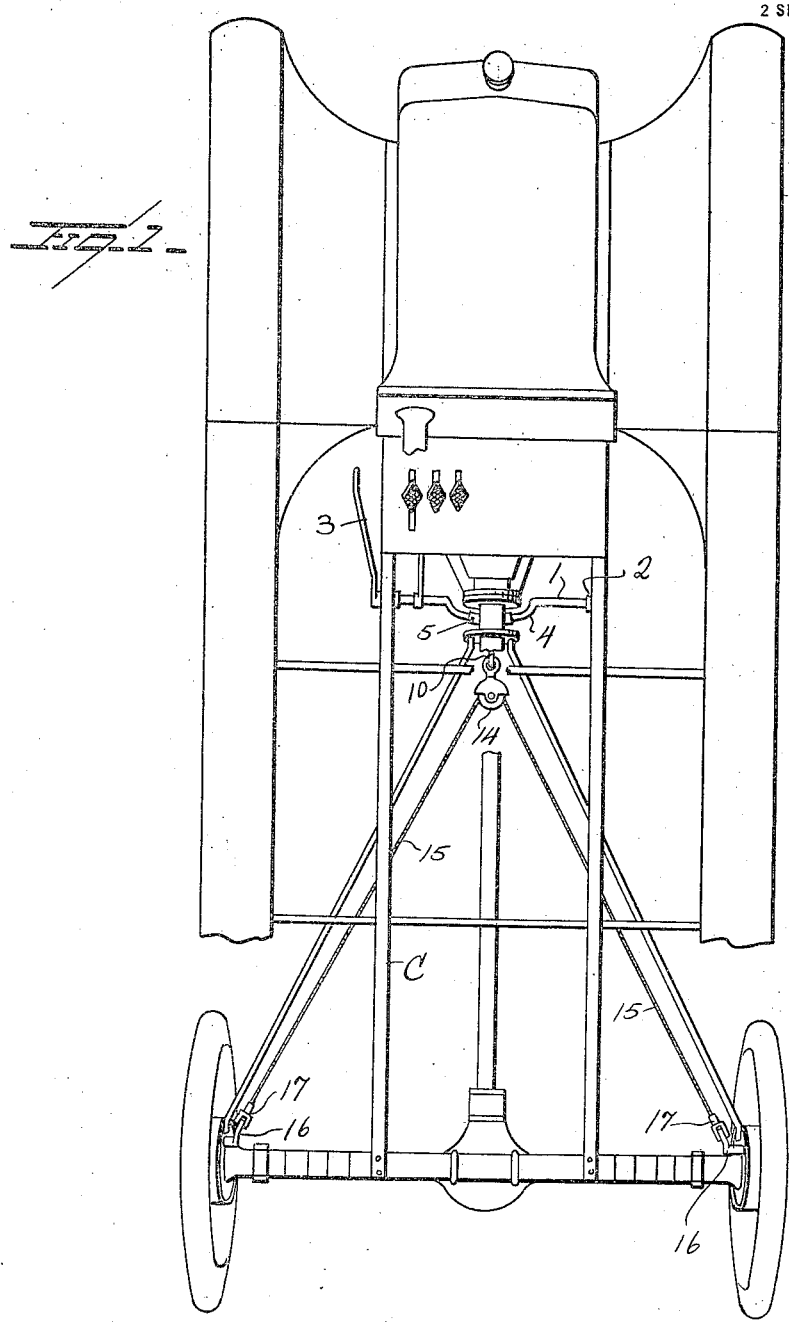

1,428,673

UNITED STATES PATENT OFFICE.

WILLIAM R. ABELL, MARBURY, MARYLAND.

BRAKE.

Application filed July 16, 1921. Serial No. 485,225.

*To all whom it may concern:*

Be it known that I, WILLIAM R. ABELL, a citizen of the United States, residing at Marbury, in the county of Charles and State of Maryland, have invented certain new and useful Improvements in Brakes, of which the following is a specification, reference being had to the accompanying drawings.

This invention relates to brakes and more particularly to emergency brakes for automobiles In the present construction of certain types of cars, the emergency brake lever is attached to a cross rod known as the controlling shaft and to this are connected the hub brake pull rods. These rods are independent and are adjusted in the clevises which connect them to the levers on the controlling shaft and the cam shaft levers, and being independent, it is extremely difficult to get them adjusted alike so that the pressure on both brake drums, when the emergency lever is applied will be equalized. Another defect is that the brake pull rods are extremely long and light and when pressure is released therefrom, they are inclined to rattle against the radius rods, thus making an additional noise to add to the discomfort of the driver.

It is the object of this invention, therefore, to provide a device which will dispense with the usual hub brake pull rods and in which the pressure on both brake drums will be absolutely equalized.

It is a further object of this invention to provide a simple and efficient device, as above described, and to provide means whereby the slack in the brake shoe operating connections is automatically taken up at all times so that there can be no contacting of these members with the radius rods thereby avoiding unnecessary noise.

Further objects of the invention will appear as the following specific description is read in connection with the accompanying drawings which form a part of this application, and in which:

Figure 1 is a perspective view of the chassis of an automobile looking from the rear thereof and with parts broken away.

Figure 2 is a sectional view through the chassis showing the method of supporting the brake cable, Figure 3 is a detail longitudinal section showing the method of adjusting, Figure 4 a detail sectional view showing one form of connecting the cable to the brake shoe clevises, and Figure 5 is a detail elevation of the controlling shaft with the clamps thereon.

Referring more particularly to the drawing, the chassis which has been indicated at C embodies all of the features of a well known type of automobile minus the brake rods which, by the use of my invention, have been omitted. The controller shaft is indicated at 1, and is, as well known, journaled in bearings 2 carried by the side bar of the chassis and is provided with the emergency brake lever 3, a description of which is unnecessary. The controller shaft is provided with a downwardly bowed portion or arch 4 to which is connected a clamp, indicated at 5. This clamp comprises identical component parts 6 curved to fit the curvature of the arch and each provided with diametrically opposite flanges 7 which are adapted to receive the securing bolts 8. It will be noted in this construction that the clamps being curved and of relatively great length that when clamped in position cannot turn upon the arch but are held stationary therewith.

Each clamping member is provided with an upstanding ear or lug 9 apertured to receive the threaded end of an eye bolt 10 which is passed therethrough and is provided with adjusting and lock nuts 11 and 12 and a jam nut 13. These nuts being threaded upon the eye bolt on opposite sides of the ears 9 effectively hold the same in adjusted position, and the clamp being curved, as previously described, the eye bolt is maintained in a rigid position, as will be readily understood.

Connected to the eye bolt is a pulley or wheel block 14 over which passes the equalizing cable 15, the opposite legs of which are attached to the opposite cam shaft levers 16 through the clevises 17. These clevises are the usual type now employed on the Ford automobile, and in order to attach the ends of the cable to them, I preferably employ the following method: The cable is passed into the opening formerly occupied by the hub brake pull rods and the fibres thereof spread out in the wedge shaped member 18 babbitted or brased therein, preferably the former, so that in case it is desired to shorten the cable, the wedge shaped members may be removed and the cable cut off and the same operation of installing the ends again performed.

The legs of the cable, as shown in Figure 1, extend almost parallel to the radius rods and in practice lie very close to the same, and when slack would have a tendency to slap against the radius rods and cause an unnecessary noise. In order to prevent this I secure to the underneath side of the floor of the vehicle a clip 19 having oppositely disposed and downwardly bent ears 20 to which are attached the inner ends of the contractile springs 21, the outer ends of which are attached to an intermediate point on the cable 15, as shown. These springs lift up on the cables and preferably pull against the pulley or block instead of against the cam shaft levers so that when the emergency brake lever is released, the cam shaft levers will be restored to normal position by the inherent resiliency of the brake shoes, as is well understood by those versed in the art.

By providing a cable operating over a pulley connected to the arch of the controlling lever, I am enabled to absolutely equalize the pressure upon each brake drum and by a single adjustment on the eye bolt can shorten or lengthen the connection between the controller shaft or brake beam. Also by connecting the cable to the body by the springs, I prevent all unnecessary rattling and at the same time take up any slack in the cables so that their action is immediate and uniform. The arch being considerably offset from the axis of the brake beam or controlling shaft, considerably greater leverage is obtained than with the present construction and the action of the brakes being equal, greater braking effect is produced.

What I claim is:

1. In combination with a motor vehicle having a brake beam with a curved offset therein, a relatively wide member connected to the offset and formed to fit the curvature thereof, and means for connecting the member to the brake operating lever of the vehicle.

2. The combination of an arched shaped lever for motor vehicle brake beams and a member for connecting said lever to connectors for the brake shoes comprising a pair of plates arcuately curved longitudinally to conform to the curvature of the arch and formed transversely to fit the cross sectional contour of the arch, and means for securing the plates together upon the arch.

3. The combination with a brake beam of a motor vehicle having an arch shaped offset, plates secured together about said arch and having apertured upstanding ears, an eye bolt adjustably engaged with said ears, a pulley connected to the eye bolt, and a flexible element passing around the pulley and connected to the brake levers of the vehicle.

In testimony whereof I hereunto affix my signature.

WILLIAM R. ABELL.